(12) United States Patent
Xiong et al.

(10) Patent No.: US 10,211,768 B2
(45) Date of Patent: Feb. 19, 2019

(54) CONTROL METHOD AND CONTROL DEVICE OF DIRECT CURRENT MACHINE

(71) Applicant: UBTECH Robotics Corp., Shenzhen (CN)

(72) Inventors: Youjun Xiong, Shenzhen (CN); Wenhua Fan, Shenzhen (CN); Xi Bai, Shenzhen (CN); Dong Liu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 3 days.

(21) Appl. No.: 15/469,491

(22) Filed: Mar. 25, 2017

(65) Prior Publication Data
US 2018/0191278 A1    Jul. 5, 2018

(30) Foreign Application Priority Data
Dec. 31, 2016    (CN) .......................... 2016 1 1264341

(51) Int. Cl.
| | |
|---|---|
| *H02P 1/00* | (2006.01) |
| *G05B 13/04* | (2006.01) |
| *H02P 9/02* | (2006.01) |
| *H02P 7/29* | (2016.01) |

(52) U.S. Cl.
CPC .............. *H02P 7/2913* (2013.01); *H02P 9/02* (2013.01)

(58) Field of Classification Search
CPC .......... H02P 6/001; H02P 9/02; G05B 13/047
See application file for complete search history.

(56) References Cited

U.S. PATENT DOCUMENTS

| | | | |
|---|---|---|---|
| 2007/0138988 A1* | 6/2007 | Takahashi | B04B 9/10 318/268 |
| 2009/0128081 A1* | 5/2009 | Yoneda | B62D 5/046 318/689 |
| 2009/0195224 A1* | 8/2009 | Kim | H02P 9/02 322/28 |
| 2010/0295489 A1* | 11/2010 | Sano | H02P 27/06 318/400.32 |
| 2015/0198935 A1* | 7/2015 | Kaku | H02P 23/12 318/561 |
| 2015/0381081 A1* | 12/2015 | Bhangu | H02P 21/0089 318/400.05 |

* cited by examiner

*Primary Examiner* — Eduardo Colon Santana
*Assistant Examiner* — Cortez M Cook

(57) ABSTRACT

A control method of direct current (DC) machine includes the following steps: obtaining a target speed n, detecting a current speed $n_k$, calculating a current rotating speed difference $e_k$, calculating a speed base voltage W according to the current speed $n_k$, calculating a PID adjustment voltage V according to the current rotating speed difference $e_k$, calculating an output voltage U according to the PID adjustment voltage V and the speed base voltage W, and driving the DC machine according to the output voltage U.

11 Claims, 3 Drawing Sheets

CONTROL METHOD AND CONTROL DEVICE OF DIRECT CURRENT MACHINE

CROSS REFERENCE TO RELATED APPLICATIONS

This application claims priority to Chinese Patent Application No. 201611264341.5, filed Dec. 31, 2016, which is hereby incorporated by reference herein in its entirety.

BACKGROUND

1. Technical Field

The present disclosure generally relates to the field of direct current (DC) machine control technology, and particularly to a proportional, integral, and differential (PID) speed proportional control method.

2. Description of Related Art

DC machine is a key component for robots. Generally, the performance of the DC machine directly affect the precision and the stability of the robots. The DC machine mainly adopts the PID control method, wherein a speed is inputted, and then the integral and derivative calculation are applied thereto. A duty cycle ratio of the control voltage is outputted, and then a switch of the power device is driven according to Hoare logic. Due to the characteristics of the PID, the response time of the machine may be slow, and the speed proportional control may cause issues, such is big overshoot.

DETAILED DESCRIPTION

Figure 1:
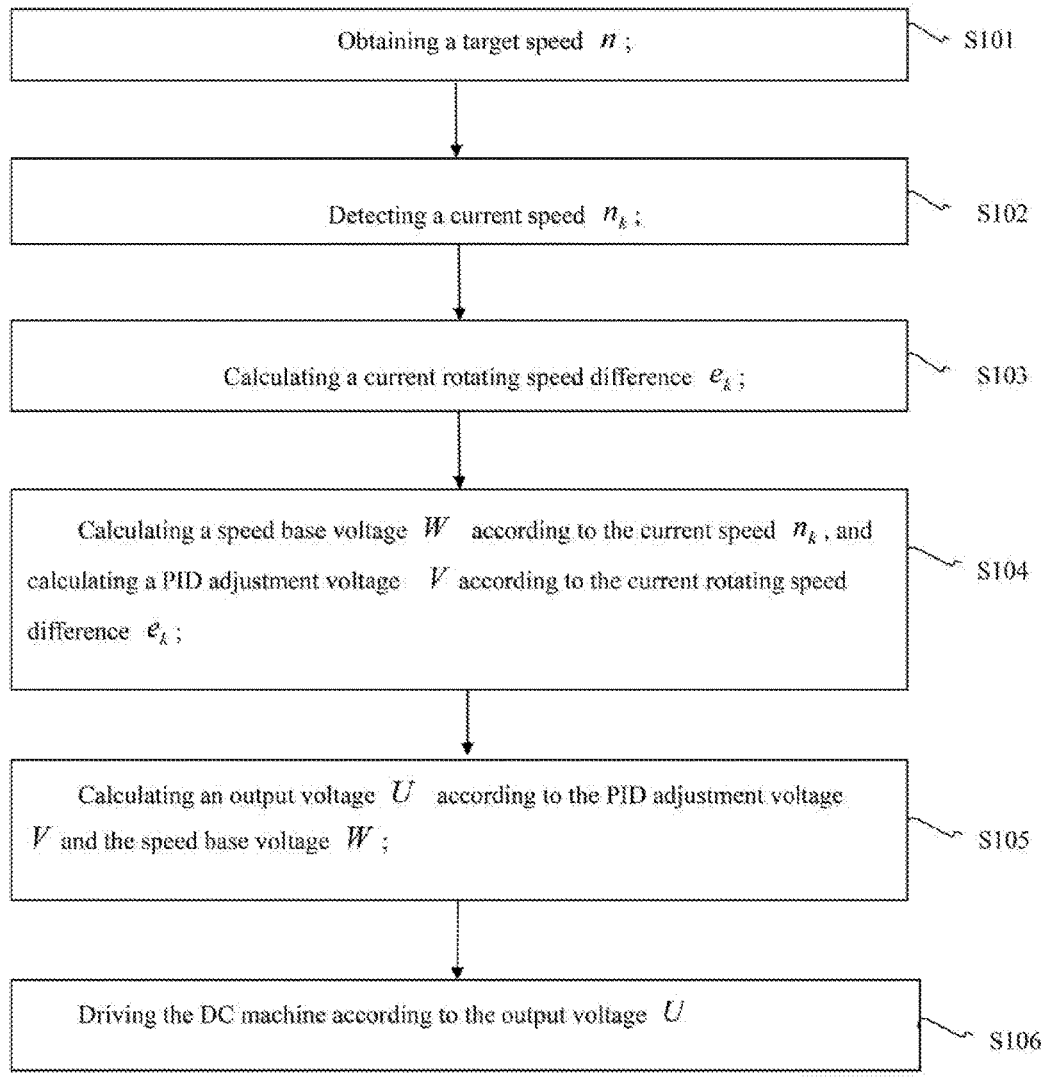
FIG. 1 is a flowchart illustrating the control method of DC machine in accordance with a first embodiment.

The disclosure is illustrated by way of example and not by way of limitation in the figures of the accompanying drawings, in which like reference numerals indicate similar elements.

A voltage equation of the DC machine is:

$$U = e + IR = Cr\varphi n + IR \quad (1)$$

Wherein e represents a counter electromotive force, I represents a resistance, Cr represents a coefficient of electromotive force, $\varphi$ represents a motor flux, and n represents a rotating speed. In view of the voltage equation, the input voltage of the machine may include two portions, including a first portion and a second portion; wherein the first portion offsets the counter electromotive force, and the first portion relates to an effective portion of the machine; and the second portion may dissipate when passing through coils, such that the second portion relates to an non effective portion or the machine.

In view of Equation 1, the input voltage and the rotating speed of the machine are in a nonlinearly proportional relationship. Basing on such relationship, most of the machines adopts PID controlling method, and the equation is shown below:

$$U_{k+1} = K_e \times e_k + (K_i \times e_k + U_i) + K_d \times (e_k - e_{k-1}) \quad (2)$$

Wherein $e_k = n - n_k$ relates to a rotating speed difference. The controlling method is simple and may be widely applicable. Nevertheless, the slow convergence or overshoot shocks may occur. Such issues are caused for the reason that the integral of the PID occupies a large portion in the vicinity of the control target speed, and the stability of the integral requires a certain convergence time.

The torque equation of the DC machine is shown as below:

$$T = C_T \varphi I \quad (3)$$

Referring to the voltage equation (Equation 1) and the torque equation (Equation 3): In Equation 1, the first portion $Cr\varphi n$ shows that the output voltage is proportional to the speed. In Equation 3, the current I is proportional to the torque T, and the torque T and the speed are in the nonlinearly proportional relationship. Thus, the current I and the speed are in the nonlinearly proportional relationship. The second portion "IR" in Equation 1 shows that the voltage and the speed are in the nonlinearly proportional relationship.

In view of the above, the input voltage of the machine includes the two portions, wherein one portion is proportional to the rotating speed of the machine, and the other portion and the speed are in the nonlinearly proportional relationship. When controlling the speed of the DC machine, the two portions of the input voltage have to be considered, wherein one portion "$K_s \times n_k$" is proportional to the rotating speed, and the other portion "$K_p \times e_k + (K_i \times e_k + U_i) + K_d \times (e_k - e_{k-1})$" and the speed are in the nonlinearly proportional relationship. Thus, the speed proportional control equation of the DC machine may be adjusted to be:

$$U_{k+1} = K_p \times e_k + (K_i \times e_k + U_i) + K_d \times (e_k - e_{k-1}) + K_s \times n_k \quad (4)$$

Wherein $Ks = Cr\varphi$.

According to the above, the method and the device of DC machine control will be described hereinafter.

First Embodiment

As shown in FIG. 1, the control method of DC machine includes the following steps:

In step S101, obtaining a target speed n;

In step S102, detecting a current speed $n_k$;

In step S103, calculating a current rotating speed difference $e_k$, wherein $e_k = n - n_k$;

In step S104, calculating a speed base voltage W according to the current speed $n_k$, and calculating a PID adjustment voltage V according to the current rotating speed difference $e_k$. The calculation of the speed base voltage W according to the current speed $n_k$ is conducted according to the equation below:

$$W = Cr \times \varphi n_k;$$

Wherein Cr represents the coefficient of electromotive force, $\varphi$ represents the motor flux.

The input voltage of the machine includes the two portions, wherein one portion relates to the speed base voltage W proportional to the rotating speed, and the other portion relates to the PID adjustment voltage V, and the PID adjustment voltage V and the speed are in the nonlinearly proportional relationship.

In step S105, calculating an output voltage U according to the PID adjustment voltage V and the speed base voltage W by the equation below:

$$U = aV + bW;$$

Wherein a and b respectively represents an adjustment coefficient and a basis coefficient. In an example, a and b are constant numbers greater than zero, and may be adjusted in accordance with real scenarios.

The adjusted equation for controlling the speed of the DC machine is U=aV+bW. Based on the traditional ratio of differential and integral calculations, a speed proportional control is also introduced such that the convergence may be faster, and the speed may be more stable. The issue, such as, the integral of the PID occupies a large portion in the vicinity of the control target speed, and the stability of the integral requires a certain convergence time, may be avoided.

In an example, the DC machine may be a brushless DC machine, and the DC machine is driven by the output voltage. The method further includes the following sub-steps:

Calculating a voltage duty-cycle ratio according to an output voltage; and

Controlling a power device to drive the DC machine according to the voltage duty-cycle ratio and a control logic of the brushless DC machine.

The PID may include analog PID and digital PID. In an example, the adjustment voltage V may be calculated by a position-type equation or an incremental equation.

When the position-type equation is adopted, the adjustment voltage V is calculated according the current rotating speed difference $e_k$. The adjustment voltage V equals to a sum of a proportional element $V_p$, an integral element Vi, and a differential element Vd, wherein $$Vp = K_P e_k,$$

$$Vi = Ki \times \sum_{i=1}^{k} e_i, Vd = Kd \times (e_k - e_{k-1}),$$

and $K_P$ is a proportional coefficient, Ki is an integral coefficient, Kd is a differential coefficient, and k is a positive integer.

When the incremental equation is adopted, the adjustment voltage V is calculated according the current rotating speed difference $e_k$. Specifically, the PID adjustment voltage V is calculated by a digital-recursive control algorithm. In an example, the digital-recursive control algorithm may be:

$$\Delta V_{k+1} = Ae_k + Be_{k-1} + Ce_{k-2};$$

$$V_{l+1} = V_k + \Delta V_{k+1};$$

Wherein A=Kp+Ki+Kd, B=Kp+2Kd, C=Kd, and $K_P$ is the proportional coefficient, Ki is the integral coefficient, and Kd is the differential coefficient. The position-type equation may be less convenient than the incremental equation for the reason that more storage units have to be adopted to accumulate the deviations. Also, the position-type equation cannot be easily programmed. Thus, the incremental equation is better than the position-type equation.

In S106, driving the DC machine according to the output voltage U. The Proportional (P) part, the Integral (I) part, and the Differential (D) part have its own contribution to the PID control algorithm. The Proportional (P) part reflects a basic (current) deviation e(t). By increasing the coefficient, the adjustment may be faster and the error may be smaller. Nevertheless, the greater the Proportional (P) part, the less stable the system is. The Differential (D) part reflects a change rate of deviation signals e(t)-(-1), that is, the Differential (D) part may reflect a trend of the deviations. In other words, before the deviation occurs, the Differential (D) part may operate to eliminate the deviations. Thus, the Differential (D) part is capable of enhancing the dynamical performance of the system. The Integral (I) part reflects the accumulated deviations so as to eliminate the stable errors. That is, the errors may be cured by the Integral (I) part, and thus the system may be in a non-error state.

The adjusted equation for controlling the speed of the DC machine is U=aV+bW. Based on the traditional ratio of differential and integral calculations, a speed proportional control is also introduced such that the convergence may be faster and the speed may be more stable. The issue, such as, the integral of the PID occupies large portion in the vicinity of the control target speed, and the stability of the integral requires a certain convergence time, may be avoided.

Second Embodiment

Figure 2:
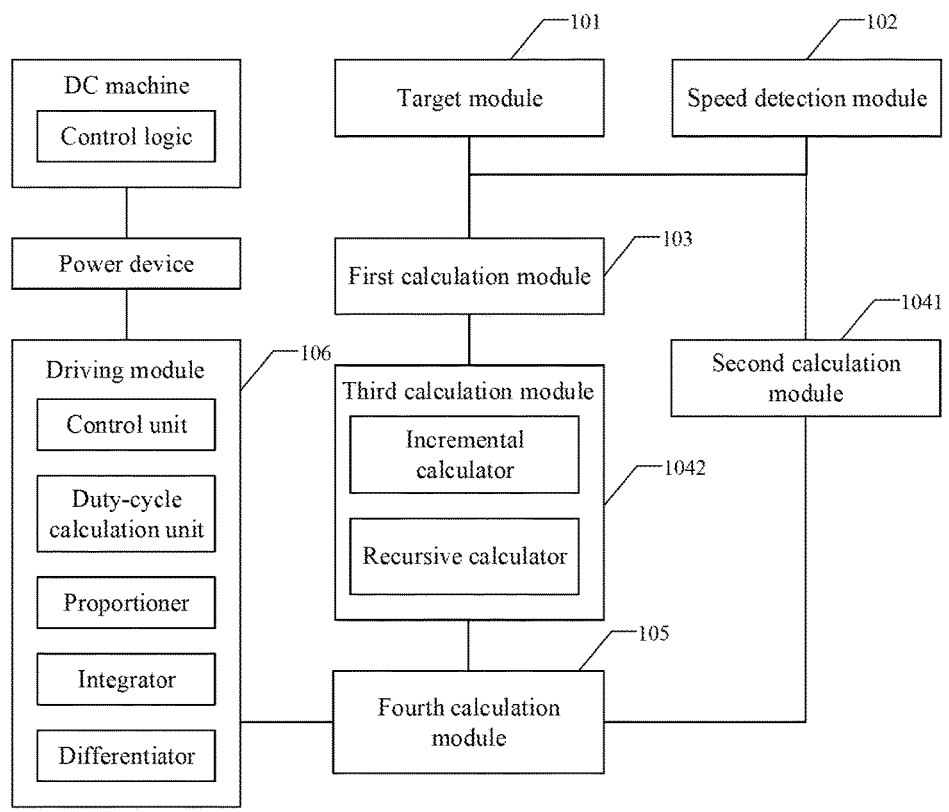
FIG. 2 is a schematic view of the control device of DC machine in accordance with a second embodiment.

As shown in FIG. 2, the control device of DC machines includes:

a target module 101 configured to obtain a target speed n;

a speed detection module 102 configured to detect a current speed $n_k$;

a first calculation module 103 configured to calculate a current rotating speed difference $e_k$;

a second calculation module 1041 configure to calculate a speed base voltage W according to the current speed $n_k$;

a third calculation module 1042 configured to calculate an adjustment voltage V according to the current rotating speed difference $e_k$;

a fourth calculation module 105 configured to calculate an output voltage U according to the adjustment voltage V and the speed base voltage W;

a driving module 106 configured to drive the DC machine according to the output voltage U.

The fourth calculation module 105 is configured to calculate the output voltage U by the equation below;

$$U=aV+bW;$$

Wherein a and b respectively represents an adjustment coefficient and a basis coefficient, and a and b are constant numbers greater than zero.

In an example, the DC machine may be a brushless machine.

The driving module 106 further includes:

a duty-cycle calculation unit configured to calculate a voltage duty-cycle ratio according to the output voltage U;

a control unit configured to control a power device to drive the DC machine according to the voltage duty-cycle ratio and a control logic of the brushless DC machine.

The third calculation module 1042 includes:

a proportioner configured to calculate the proportional element Vp, Vp=$K_P e_k$, and $K_P$ is a proportional coefficient;

an integrator configured to calculate the integral element $$Vi, Vi = Ki \times \sum_{i=1}^{k} e_i,$$

and Ki is an integral coefficient;

a differentiator configured to calculate the differential element Vd, Vd=Kd×($e_k - e_{k-1}$), Kd is a differential coefficient;

In one embodiment, the third calculation module 1042 further includes:

an incremental calculator configured to calculate an adjustment increment $\Delta V_{k+1}$, $\Delta V_{k+1}=Ae_k+Be_{k-1}+Ce_{k-s}$, wherein $A=Kp+Ki+Kd$, $B=Kp+2Kd$, $C=Kd$, $K_P$ is the proportional coefficient, Ki is the integral coefficient, and Kd is the differential coefficient;

a recursive calculator configured to calculate the PID adjustment voltage $V_{k+1}$, $V_{k+1}=V_k+\Delta V_{k+1}$.

The device in the second embodiment and the method in the first embodiment are two aspects basing on the same invention. Thus, the structure and the operations of the device may be conceived by referring to the descriptions in the first embodiment, and thus are omitted hereinafter.

For convenience of description, the functions are divided into various modules or units. It can be understood that the functions may be implemented by one or a plurality of software and/or or hardware.

In view of the embodiments described above, persons skilled in the art can conceive that the present application may be implemented by software together with hardware platform. Based on such understanding, the technical features of the present disclosure, contributing to the prior art, can be embodied in the form of a software product, and the software product may be stored in a storage medium, such as ROM/RAM, disk, CD-ROM, including a plurality of instructions that an be executed by a computer device, which may be a personal computer, a server, or network equipment, so as to execute the method or the various embodiments of the present disclosure.

The illustrated embodiment of the device is merely illustrative, wherein the modules or units described as separate components may or may not be physically separate, and the components indicated as modules or units may or may not be physical modules that can be located in one place or can be distributed to multiple network modules. A portion or all of the elements may be selected according to the real scenarios so as to achieve technical effects of the present embodiment. Persons skilled in the art can understand and practice the above without further creative efforts.

The present invention may be used in a number of general or proprietary computing system environments or configurations, such as personal computers, server computers, handheld devices or portable devices, tablet devices, multiprocessor systems, microprocessor-based systems, set-top boxes, programmable consumer electronics devices, web PCs, small computers, large computers, a distributed computing environment for any system or device, and the like, as described in the third embodiment.

Third Embodiment

Figure 3:
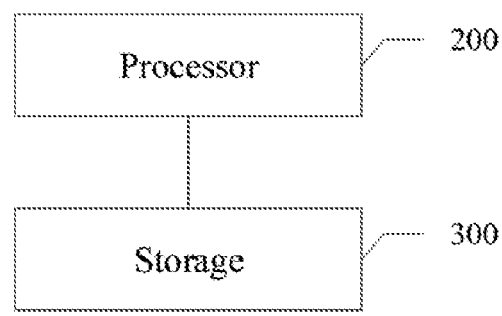
FIG. 3 is a schematic view of the control device of DC machine in accordance with a third embodiment.

As shown in FIG. 3, the control device of DC machines includes:

a processor 200 and a storage 300 for storing instructions that can be executed by the processor 200.

The processor 200 is configured to:
obtain a target speed n;
detect a current speed $n_k$;
calculate a current rotating speed difference $e_k$;
calculate a speed base voltage W according to a current speed $n_k$ and calculate an adjustment voltage V according to the current rotating speed difference $e_k$;
calculate an output voltage U according to the adjustment voltage V and the speed base voltage W;
drive the DC machine according to the output voltage U.

The device in the third embodiment and the method in the first embodiment are two aspects basing on the same invention. Thus, the structure and the operations of the device may be conceived by referring to the descriptions in the first embodiment, and thus are omitted hereinafter.

In view of the above, the control device of DC machine adopts a speed proportional control such that the convergence may be faster, and the speed may be more stable. In this way, the issue, such as, the integral of the PID occupies a large portion in the vicinity of the control target speed, and the stability of the integral requires a certain convergence time, may be avoided.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A control method of direct current (DC) machine, comprising:
   obtaining a target speed n;
   detecting a current speed $n_k$;
   calculating a current rotating speed difference $e_k$, wherein $e_k=n-n_k$;
   calculating a speed base voltage W according to the current speed $n_k$, and calculating a PID adjustment voltage V according to the current rotating speed difference $e_k$, wherein the speed base voltage W is proportional to the current speed $n_k$, and the PID adjustment voltage V is nonlinearly proportional to the current speed $n_k$;
   calculating an output voltage U according to the PID adjustment voltage V and the speed base voltage W; and
   driving the DC machine according to the output voltage U;
   wherein the step of driving the DC machine according the output voltage U further comprises:
   calculating a voltage duty-cycle ratio according to an output voltage; and
   driving the DC machine according to the voltage duty-cycle ratio and a control logic of the brushless DC machine by means of a power device;
   wherein the speed base voltage W is calculated by an equation below according to the current speed $n_k$:

$W=Cr\times\phi\times n_k$;

wherein Cr represents the coefficient of electromotive force, and $\phi$ represents the motor flux.

2. The control method of claim 1, wherein the output voltage U is calculated by an equation below according to the PID adjustment voltage V and the speed base voltage W:

$U=aV+bW$;

wherein a and b respectively represents an adjustment coefficient and a basis coefficient.

3. The control method of claim 1, wherein the step of calculating the PID adjustment voltage V according to the current rotating speed difference $e_k$ further comprises:
   the PID adjustment voltage V equals to a sum of a proportional element Vp, integral element Vi, and a differential element Vd, wherein $Vp=K_Pe_k$, $$Vi = Ki\times \sum_{i=1}^{k} e_i, Vd = Kd\times(e_k - e_{k-1}),$$

and $K_P$ is a proportional coefficient, Ki is an integral coefficient, Kd is a differential coefficient, and k is a positive integer.

4. The control method of claim 1, wherein the step of calculating the PID adjustment voltage V according to the current rotating speed difference $e_k$ further comprises:

the PID adjustment voltage V is calculated by a digital-recursive control algorithm, and is calculated by equations:

$$\Delta V_{k+1} = Ae_k + Be_{k-1} + Ce_{k-2};$$

$$V_{k+1} = V_k + \Delta V_{k+1};$$

wherein A Kp+Ki+Kd B=Kp+2Kd C=Kd, and $K_P$ is a proportional coefficient, Ki is an integral coefficient, and Kd is a differential coefficient.

5. The control method of claim 1, wherein the DC machine is a brushless DC machine.

6. A control device of direct current (DC) machine, comprising:
a target module configured to obtain a target speed n;
a speed detection module configured to detect a current speed $n_k$;
a first calculation module configured to calculate a current rotating speed difference $e_k$, wherein $e_k = n - n_k$;
a second calculation module configured to calculate a speed base voltage W according to the current speed $n_k$, wherein the speed base voltage W is proportional to the current speed $n_k$;
a third calculation module configured to calculate a PID adjustment voltage V according to the current rotating speed difference $e_k$, wherein the PID adjustment voltage is nonlinearly proportional to the current speed $n_k$;
a fourth calculation module configured to calculate an output voltage U according to the PID adjustment voltage V and the speed base voltage W; and
a driving module configured to drive the DC machine according to the output voltage U;
wherein the driving module further comprises:
a duty-cycle calculation unit is configured to calculate a voltage duty-cycle ratio according to the output voltage U; and
a control unit is configured to drive the DC machine according to the voltage duty-cycle ratio and a control logic of the DC machine by means of a power device;
wherein the speed base voltage W is calculated by an equation below according to the current speed $n_k$:

$$W = Cr \times \phi \times n_k;$$

wherein Cr represents the coefficient of electromotive force, and $\phi$ represents the motor flux.

7. The control device of claim 6, wherein the fourth calculation module is configured to:
calculate the output voltage U by the equation:

$$U = aV + bW;$$

wherein a and b respectively represents an adjustment coefficient and a basis coefficient, and a and b are constant numbers greater than zero.

8. The control device of claim 6, wherein the DC machine is a brushless DC machine.

9. The control device of claim 6, wherein the third calculation module further comprises:
a proportioner configured to calculate the proportional element Vp, $Vp = K_P e_k$, and $K_P$ is a proportional coefficient;
an integrator configured to calculate the integral element Vi, $$Vi = Ki \times \sum_{i=1}^{k} e_i,$$

and Ki is an integral coefficient;
a differentiator configured to calculate the differential element Vd, $Vd = Kd \times (e_k - e_{k-1})$,
Kd is a differential coefficient, and k is a positive integer.

10. The control device of claim 6, wherein the third calculation module further comprises:
an incremental calculator configured to calculate an adjustment increment $\Delta V_{k+1}$, $\Delta V_{k+1} = Ae_k + Be_{k-1} + Ce_{k-2}$, wherein A=Kp+Ki+Dk, B=Kp+2Kd, C=Kd, $K_P$ is they proportional coefficient, Ki is the integral coefficient, and Kd is the differential coefficient;
a recursive calculator configured to calculate the PID adjustment voltage $V_{k+1}$, $V_{k+1} = V_k + \Delta V_{k+1}$.

11. A control device of DC machines, comprising:
a processor and a storage stored with instructions to be executed by the processor;
the processor is configured to:
obtain a target speed n;
detect a current speed $n_k$;
calculate a current rotating speed difference $e_k$, wherein $e_k = n - b_k$;
calculate a speed base voltage W according to the current speed $n_k$, and calculating a PID adjustment voltage V according to the current rotating speed difference $e_k$, wherein the speed base voltage W is proportional to the current speed $n_k$, and the PID adjustment voltage V is nonlinearly proportional to the current speed $n_k$;
calculate an output voltage U according to the PID adjustment voltage V and the speed base voltage W; and
drive the DC machine according to the output voltage U;
wherein the step of driving the DC machine according to the output voltage U further comprises:
calculating a voltage duty-cycle ratio according to an output voltage U; and
driving the DC machine according to the voltage duty-cycle ratio and a control logic of the brushless DC machine by means of a power device;
wherein the speed base voltage W is calculated by an equation below according to the current speed $n_k$:

$$W = Cr \times x \times n_k;$$

wherein Cr represents the coefficient of electromotive force, and $\phi$ represents the motor flux.

* * * * *